United States Patent [19]

Rice

[11] Patent Number: 4,789,968
[45] Date of Patent: Dec. 6, 1988

[54] METHOD AND SYSTEM FOR SEISMIC EXPLORATION EMPLOYING A DUAL-DIPOLE HYDROPHONE STREAMER

[75] Inventor: James A. Rice, Houston, Tex.

[73] Assignee: Exxon Production Research Company, Houston, Tex.

[21] Appl. No.: 42,194

[22] Filed: Apr. 24, 1987

[51] Int. Cl.$^4$ .................. G01V 1/40; G01V 1/38
[52] U.S. Cl. ........................ 367/20; 367/25; 367/129; 181/104
[58] Field of Search ............... 181/104, 110, 112; 367/20, 25, 28, 178, 118, 120, 124, 125, 126, 129, 140, 153, 154, 911, 57, 58

[56] References Cited

U.S. PATENT DOCUMENTS

| | | | |
|---|---|---|---|
| 3,136,381 | 6/1964 | Anderson | 367/25 |
| 3,496,527 | 2/1970 | Ziehm et al. | 367/118 |
| 3,517,768 | 6/1970 | Straus | 181/104 |
| 3,593,255 | 7/1971 | White | 367/25 |
| 3,794,976 | 2/1974 | Mickler | 367/75 |
| 3,872,478 | 3/1975 | Lucole | 346/7 |
| 4,078,223 | 3/1978 | Strange | 367/58 |
| 4,534,020 | 8/1985 | O'Brien | 181/401 |
| 4,542,487 | 9/1985 | Benzing et al. | 367/911 |
| 4,606,014 | 8/1986 | Winbow et al. | 367/75 |

Primary Examiner—Thomas H. Tarcza
Assistant Examiner—Ian J. Lobo
Attorney, Agent, or Firm—Alfred A. Equitz; Herbert E. O'Niell

[57] ABSTRACT

A seismic exploration method and system employing a streamer that houses at least one pair of orthogonally mounted hydrophones. The streamer may be operated downhole in a well, or may be towed in a body of water by a marine vessel. In the downhole embodiment, the invention permits detection of seismic signals of interest with suppression of noise due to tube waves and (dipole and monopole) modal waves propagating in and along the well, and without the need for locking the seismic detectors to the wall of the well. In the marine embodiment, the invention permits selective detection of waves incident from any incidence direction of interest (including the horizontal and vertical directions). In all embodiments, the incidence angle of the detected seismic wave is determined. The amplitude of the detected wave may also be determined from the incidence angle and the amplitude components detected at each hydrophone.

18 Claims, 3 Drawing Sheets

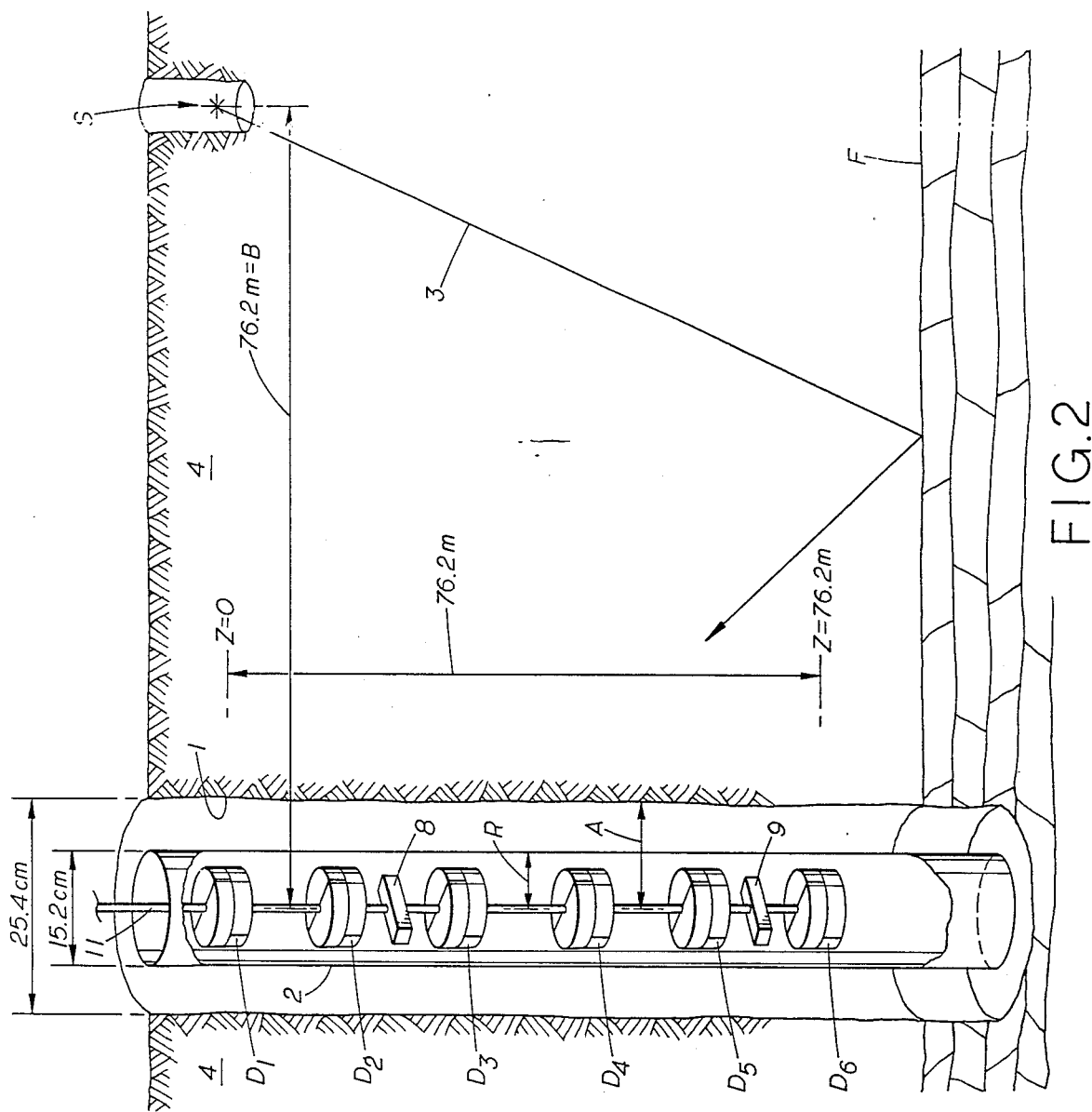
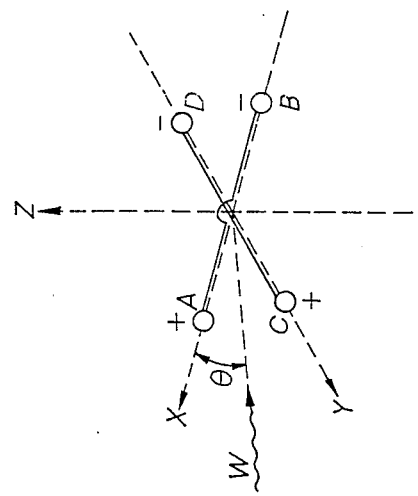
FIG.1
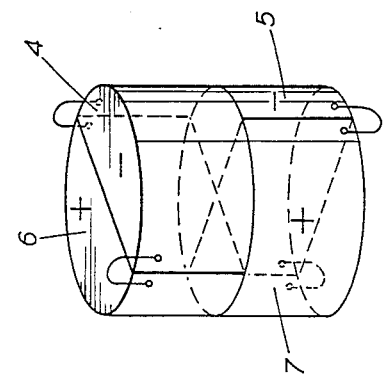
FIG.3
FIG.2

METHOD AND SYSTEM FOR SEISMIC EXPLORATION EMPLOYING A DUAL-DIPOLE HYDROPHONE STREAMER

FIELD OF THE INVENTION

The invention is a method and system for land or marine seismic exploration. More particularly, the invention is a method and system employing a streamer that houses at least one pair of orthogonally mounted acoustic dipole wave hydrophones for detecting seismic wave energy that has propagated through a subterranean earth formation.

BACKGROUND OF THE INVENTION

It is well known in the field of seismic exploration to obtain information about a subterranean earth formation by using sources of seismic energy disposed on the surface of the earth (or in a shallow pit) and seismic detectors disposed at different depths in a nearby well (the synonymous terms "well" and "borehole" will be used interchangeably throughout the Specification). This technique is known as "Vertical Seismic Profiling." It may also be desirable to employ a downhole seismic source in one well and seismic detectors disposed in another well for seismic exploration.

In seismic exploration, seismic waves generated by the source are reflected by subterranean reflecting surfaces ("reflectors"), and the reflected waves are then detected by seismic detectors such as hydrophones. Seismic detectors have been disposed in a body of water, at the bottom of a body of water, and in wells remote from the seismic source.

One of the limitations of conventional techniques that use monopole hydrophones (i.e., hydrophones that are sensitive to monopole seismic waves) placed downhole in wells is that monopole tube wave arrivals (and to a lesser degree, dipole and higher multipole order modal waves) will dominate their response, obscuring arrivals representing seismic waves that have undergone reflection from a reflector in the subterranean formation. The tube wave and modal wave arrivals, in contrast, represent wave energy that has propagated from the seismic source to the well in which the detector is disposed without necessarily having undergone reflection in the formation, and has then undergone conversion into a tube wave (or other) mode, which mode propagates in the borehole fluid and the formation immediately adjacent the well.

To suppress tube wave noise, downhole wall-locking geophones have been employed in place of monopole hydrophones. These geophones are positioned in direct contact against the borehole wall, typically by elements that may be extended outward to the borehole wall from a sonde suspended in the borehole fluid at the end of a wireline. However, a serious disadvantage inherent in using wall-clamping geophones is the inordinately long time required to position each geophone, lock it against the borehole wall, and slacken the suspending wireline, which must be done for each receiver location. The speed of acquiring downhole data using wall-locking geophones may be reduced by a factor of fifty or more relative to the speed attainable using non-wall-locking hydrophones.

In conventional marine seismic exploration, hydrophones are typically mounted in elongated cables known as "streamers"Undesired noise often results from acoustic wave energy that propagates generally horizontally to the hydrophones in the streamer, such as seismic wave energy propagating directly through the water from a marine seismic source to the streamer and cable waves which propagate along the streamer. The problem arises due to use of monopole hydrophones which are omnidirectional in the sense that they are sensitive to pressure waves incident from all directions. Omnidirectional receivers are conventionally employed since a marine streamer will unpredictably twist about its axis as it is towed through the water so that unidirectional receivers would be rendered insensitive to vertically propagating waves reflected from subfloor subteranean reflectors at unpredictable moments due to the twisting motion of the streamer.

It has been proposed in U.S. Pat. No. 4,078,223, issued Mar. 7, 1978 to Strange that geophones be mounted in a seismic detector cable and oriented in different directions perpendicular to the cable's longitudinal axis. During operation, the cable is dragged along the earth surface or the submerged floor of a body of water in such a manner that the cable may twist about its axis when in operation. The geophones that happen to be vertically oriented at any given moment are sensitive to vertically propagating seismic waves but not to horizontally propagating seismic waves. The geophones that happen to be horizontally oriented at a given moment are disabled (such as by gravity operated switches or other electrical or mechanical arrangements) so as to be insensitive to seismic waves. The disadvantages of the Strange system for marine seismic exploration include the following. The frequency response of geophones of the type employed in the Strange system is not flat in the range of interest, and instead is limited to the range of about 10 to 200 Hz. Further, the Strange system does oot detect both vertically and horizontally propagating seismic waves. Finally, the Strange system could not determine the amplitude and incidence angle of non-vertically propagating seismic signals of interest.

Until the present invention it has not been known that a streamer that houses at least one pair of orthogonal dipole hydrophones can be employed to eliminate both the above-recited disadvantages of marine seismic exploration, and the above-recited disadvantages of land seismic exploration operations in which seismic receivers are deployed downhole in a well.

SUMMARY OF THE INVENTION

The invention is a seismic exploration method and system employing a streamer that houses at least one pair of orthogonally mounted dipole hydrophones. In a land seismic exploration embodiment, the streamer is operated in borehole fluid in a borehole. In a marine seismic exploration embodiment the streamer is towed in a body of water by a marine vessel or the like.

Each dipole hydrophone of the inventive streamer is preferably of the type including one or more piezoelectric crystals, and has an axis of symmetry perpendicular to the plane of the hydrophone's positive and negative poles. Thus, the sensitivity of the hydrophone to compressional waves incident at an angle $\Theta$ (in the plane of the hydrophone's positive and negative poles) relative to the positive pole on the axis of the dipo.e,l is proportional to cos ($\Theta$). When deployed in a borehole, the hydrophones of the inventive system will be insensitive to monopole (symmetrical) tube waves and monopole modal waves, and preferably will be designed to be insensitive to dipole modal waves by inclusion of filters for suppressing the frequency components of wave energy incident at the hydrophones that have frequency above the threshold frequency for dipole modal wave propagation in the borehole.

All embodiments of the inventive system include means for determining the incidence angle of seismic waves detected by each pair of orthogonal dipole hydrophones in the system. All embodiments of the inventive method include the step of determining such incidence angle.

BRIEF DESCRIPTION OF THE DRAWINGS

FIG. 1 is a diagram showing schematically the basic elements of a pair of orthogonal hydrophones of the type employed in the inventive system.

FIG. 2 is a simplified perspective view of a seismic streamer disposed in a borehole. Six pairs of orthogonal hydrophones are mounted in the streamer. Also indicated schematically is a point source (S) of seismic energy disposed far from the borehole.

FIG. 3 is a simplified perspective view of a preferred embodiment of a pair of orthogonal hydrophones that may be used in the inventive system.

DETAILED DESCRIPTION OF THE PREFERRED EMBODIMENTS

Figure 5:
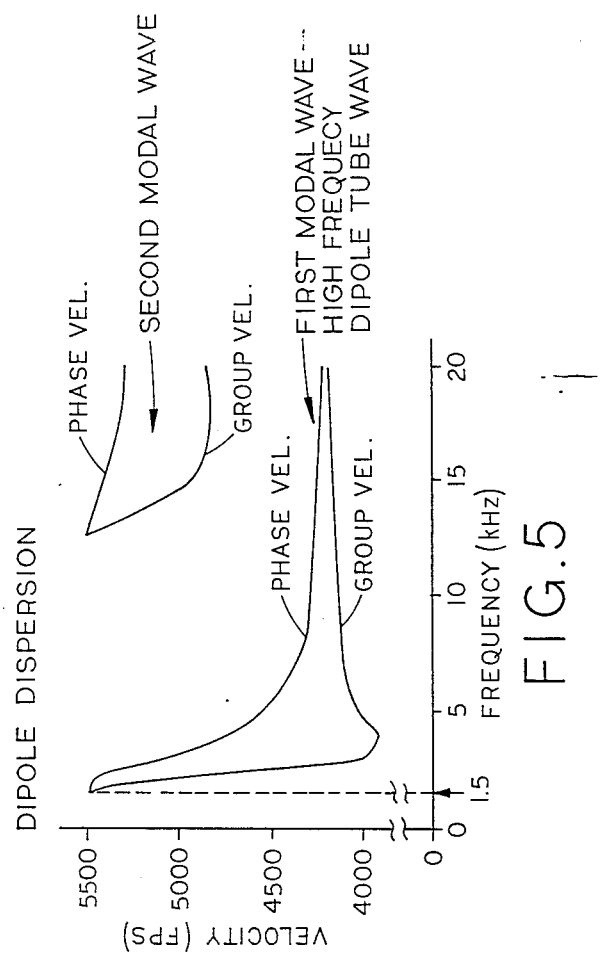
FIG. 5 is a graph showing typical dispersion curves for dipole modal waves propagating in a borehole and in the adjacent earth formation surrounding the borehole.

The terms "water" and "borehole fluid" as used herein, including in the claims, are meant to include mud, swamp water, marsh water and any other substance displaceable by the streamer employed in the invention and containing sufficient liquid to enable operation of the hydrophones employed in the invention.

A dipole hydrophone of the type employed in the inventive method and system is schematically represented by positive pole A and negative pole B in FIG. 1. The imaginary line between the positive and negative poles is the axis of the dipole or of the dipole hydrophone, as applicable. This hydrophone is shown to be aligned along the x-axis in the x-y plane in FIG. 1. Hydrophone AB is a "dipole" hydrophone since its sensitivity, to incoming planar compressional waves having planar wave fronts perpendicular to the x-y plane, is proportional to sin $\Theta$, where $\Theta$ is the waves' angle of incidence relative to the x-axis in the x-y plane. If disposed in a borehole containing fluid and oriented as shown in FIG. 1, dipole hydrophone AB's sensitivity to pressure waves in the fluid caused by vertically polarized shear waves (i.e. shear waves polarized in the z-direction in FIG. 1) propagating past the borehole is proportional to sin $\Theta$. If the shear waves are polarized in a direction perpendicular to the z-axis, hydrophone AB will have sensitivity, to pressure waves in the fluid caused by such horizontally polarized shear waves, proportional to cos $\Theta$.

The axis of a second hydrophone, dipole hydrophone CD, is shown in FIG. 1 to be aligned with the y-axis in the x-y plane. The sensitivity pattern of hydrophone CD will be rotated by 90° in the x-y plane relative to that of hydrophone AB. Thus, hydrophone AB will be insensitive to a compressional wave propagating with incidence angle $\Theta = 90°$ (i.e. along the y-axis), while hydrophone CD will be maximally sensitive to such a compressional wave.

FIG. 2 is a simplified view of a streamer (identified by reference numeral 2) of the type employed in the inventive method and system. Streamer 2 is suspended from cable 11 in borehole 1, and includes six pairs of orthogonally mounted dipole hydrophones. Streamer 2 may be lowered into borehole 1 for seismic data gathering, and then pulled out of borehole 1 at the conclusion of data gathering operations. Each hydrophone pair is identified by the symbol $D_i$, where $1 \leq i \leq 6$. Each hydrophone pair shown in FIG. 2 is of the type to be described below with reference to FIG. 3 (although other embodiments of the hydrophone pairs may alternatively be employed). Streamer 2 is disposed in borehole 1, so that the longitudinal axes of streamer 2 and of borehole 1 are parallel to the z-axis. The geometry of seismic source S and the detectors of streamer 2 in FIG. 2 is typical of that employed for Vertical Seismic Profiling. Radius A of borehole 1 is equal to 12.7 cm. Radius R of streamer 2 is equal to 7.6 cm. Seismic source S is positioned in the Z=0 plane at a radial distance B=76.2 m from the axis of streamer 2. Subterranean reflector F occupies a horizontal plane. Hydrophone pair $D_1$ is positioned at Z=0, hydrophone pair $D_6$ is positioned at Z=76.2 m, and the remaining hydrophone pairs are mounted with substantially equal spacing between pairs $D_1$ and $D_6$. Although six hydrophone pairs are shown, it is contemplated that more than six or less than six may be employed in practicing the invention.

Seismic source S produces seismic wave 3 which propagates in earth formation 4 traversed by borehole 1, and reflects from reflector F. Wave energy reflected from reflector F is then detected by one or more of the hydrophones in streamer 2.

Orientation sensing devices 8 and 9 (to be discussed in greater detail below) are mounted within streamer 2 for determining the orientation of hydrophone pairs $D_1$-$D_6$ relative to formation 4.

FIG. 3 is a simplified perspective view of a preferred embodiment of a pair of orthogonal dipole hydrophones of tbe type discussed with reference to FIG. 1. One hydrophone includes semi-cylindrical piezoelectric element 4 and semi-cylindrical piezoelectric element 6. The other hydrophone includes semi-cylindrical piezoelcctric elements 5 and 7. Elements 5 and 7 are identical to elements 4 and 6, respectively, except that they are rotated by 90° (about the longitudinal axis of the cylinder defined by the four elements 4, 5, 6, and 7) relative to elements 4 and 6. Elements 4 and 5 are polarized so that one will produce a positive electric signal in response to radially inward pressure while elements 6 and 7 are polarized so as to produce a negative electric signal in response to radially inward pressure. Suitable seismic detectors of type comprising elements 4 and 6 (or 5 and 7) may be constructed using cylindrical crystals manufactured by PCB Piezotronics, Inc., 3425 Walden Ave., Depew, N.Y. For use in the inventive system, such crystals are first cut (in the plane of their longitudinal axis) into two halves, and then the semi-cylindrical crystal halves are electrically connected together in a manner that will be apparent to those of ordinary skill in the art.

Figure 4:
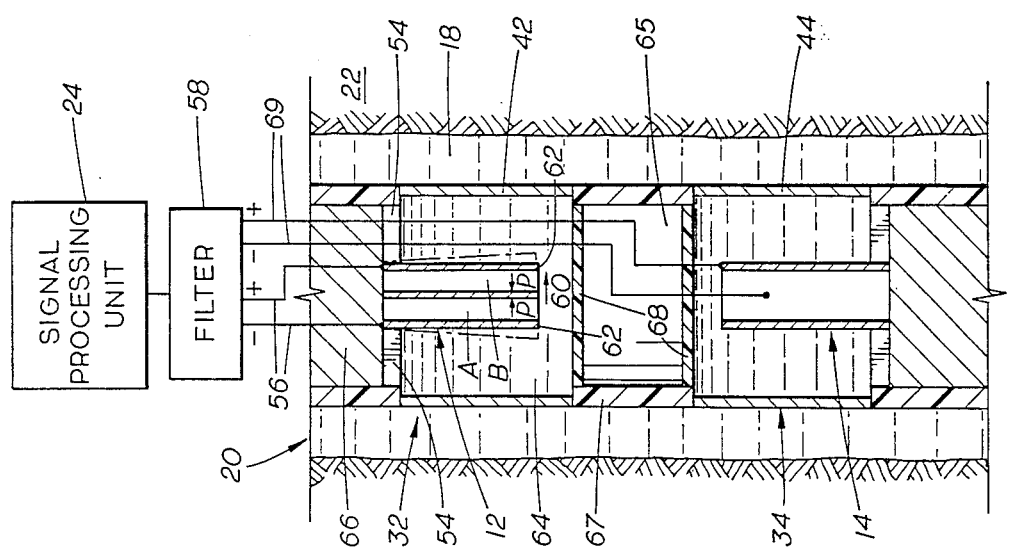
FIG. 4 is a partial cross-sectional view of a preferred embodiment of the inventive system.

FIG. 4 is a partial cross-sectional view of a preferred embodiment of the inventive system shown in simplified form, and partially schematically, in FIG. 2. Streamer 32 of FIG. 4 is disposed in fluid 18 in borehole 20 in formation 22. Streamer 32 includes dipole hydrophones 12 and 14. Dipole hydrophone 12 includes a composite plate formed by two elongated piezoelectric plates A and B, each having a two parallel flat surfaces and two ends. Plates A and B are connected together by their flat surfaces to form the composite plate. Each of plates A and B is polarized substantially perpendicularly to its flat surfaces, and the polarizations of the two plates are in substantially opposite directions. One end of composite plate 12 is held between two clamping plates 54 which keep composite plate 12 in place while it is vibrating. The outside exposed flat surfaces of composite plate 12 are connected by wires 56 to signal processing unit 24 through filter 58. If a pressure wave in fluid 18 causes the two flat surfaces of composite plate 12 (which comprises a pair of oppositely polarized piezoelectric plates) to bend in the direction of arrow 60, an electrical pulse will be induced across composite plate 12. The polarity of the pulse is as shown in FIG. 4.

For better efficiency, the flat surfaces of dipole hydrophone 12 are preferably parallel to the longitudinal axis of well 20 so that the hydrophone is sensitive to horizontally polarized dipole seismic wave energy, although other orientations are acceptable. While the polarizations of composite plate 12 are preferably perpendicular to its flat surfaces, it will be understood that, for vibration of plate 12 to produce an electrical pulse, the polarizations need only be such that they have components along the direction of vibration of plate 12.

The composite plate comprising the pair of oppositely polarized piezoelectric plates is readily available commercially. Piezoelectric composite plates supplied by the Vernitron Company of Bedford, Ohio, known as Bender Bimorphs are satisfactory. The commercially available piezoelectric composite plates which may be used for the purpose of this invention are usually sold in the form of two piezoelectric plates connected through a conducting layer which is sandwiched between the two piezoelectric plates. The outside flat surfaces of the composite plates are also usually coated by conducting layers. Such conducting layers, shown in FIG. 4 as layers 62, will improve the efficiency of the dipole detector. The space surrounding composite plate 12 and enclosed by the skin 67 and window 42 is filled by oil 64. Skin 67 is preferably made of flexible plastic, mylar ®, or kevlar ®. Window 42 is preferably made of flexible kevlar ®. Skin 67 and window 42 are preferably composed of materials selected so that the acoustic impedance of streamer 32 matches that of fluid 18. An example of such a material that will be suitable for use in typical borehole fluid is kevlar ®. The upper portion of streamer 32 is filled by backing material 66 which preferably will have good damping qualities so as to damp out the reverberations of plate 12 so that the electrical pulse generated by vibration of plate 12 is short in duration. Diaphragm 68 seals the oil 64 from cavity 65 of streamer 32 which may be filled by air.

As shown in FIG. 4, dipole hydrophone 14 is similar in construction to detector 12 except that it is rotated by 90° about the streamer's longitudinal axis. The manner in which detector 14 is connected to streamer 32 is the same as the manner in which detector 12 is connected to streamer 32. The outside exposed conducting layers of detector 14 are connected to filter 58 by wires 69.

Preferably the flat surfaces of detector 14 are substantially perpendicular to the flat surfaces of detector 12 and the directions of polarization of detector 14 are substantially perpendicular to the directions of polarizations of detector 12.

Preferably, in any of the inventive embodiments, the hydrophones comprising any given pair of orthogonal hydrophones (for example, hydrophones 12 and 14 in FIG. 4) will be mounted at substantially the same position along the streamer's longitudinal axis (i.e. they will be separated by a spacing that is small relative to the wavelength of the seismic waves to be detected).

Filter 58 is a low-pass filter selected to suppress frequency components of the detected signals having frequency greater than the threshold frequency for dipole modal wave propagation in the borehole. The reason for use of this filter will become apparent from analysis of FIG. 5, to be discussed below.

Due to the geometry of a fluid filled borehole with hydrophones disposed therein, dipole modal waves will not propagate in a borehole unless the dipole modal waves have frequency above a cutoff frequency determined in a well known manner by the borehole adius, hydrophone radius, the velocity of compressional waves in the borehole fluid, and the velocity of shear and compressional waves the formation traversed by the borehole. A set of typical dispersion curves for dipole modal waves is shown in FIG. 5. FIG. 5 assumes that the radius of the borehole is 0.10 meters, the radius of the hydrophone in the borehole is 0.05 meters, the velocity of compressional waves in the borehole fluid is 1650 m/s, the velocity of compressional waves in the formation surrounding the borehole is 3240 m/s, and the velocity of shear waves in the formation surrounding the borehole is 1800 m/s. FIG. 5 shows that no dipole modal waves having frequency less than 1.5 kHz can propagate in the borehole (and immediately adjacent formation).

Figure 6:
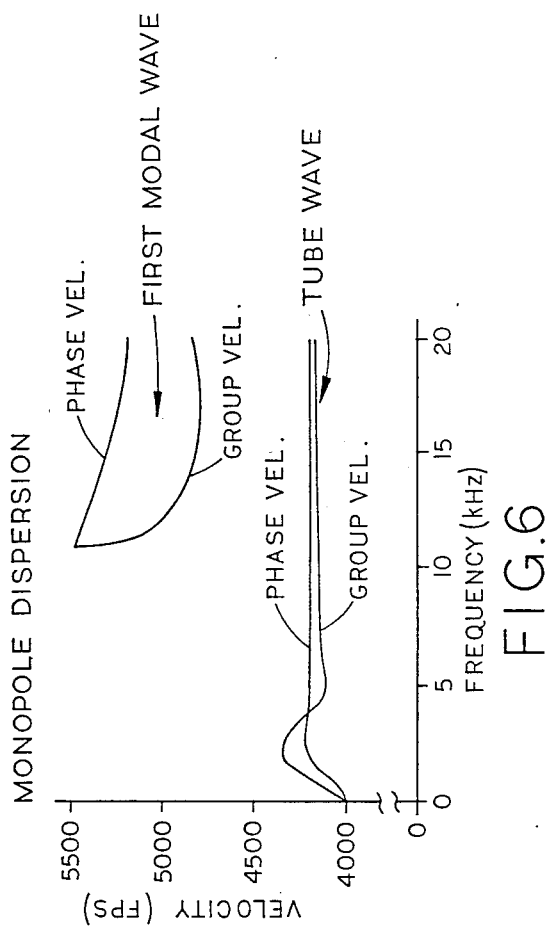
FIG. 6 is a graph showing typical dispersion curves for monopole tube waves and monopole modal waves propagating in a borehole and in the adjacent earth formation surrounding the borehole.

Thus, where one is operating in an environment having the FIG. 5 parameters, one should choose filter 58 to be capable of suppressing frequency components above 1.5 kHz. Alternatively, if one employs a seismic source that generates seismic signals having no significant frequency components above 1.5 kHz, filter 58 would be unnecessary and could be eliminated. FIG. 6 shows dispersion curves for monopole tube and modal waves capable of propagating given the same geometry and wave velocities as were assumed in FIG. 5. Though a monopole tube wave mode exists at low frequencies (approaching 0 Hz), properly oriented dipole detectors (such as the dipole hydrophones of the inventive system) are inherently insensitive to such monopole tube waves (and to other monopole modal waves such as the first modal wave depicted in FIG. 6), at all frequencies. Modal waves (having amplitude M) travel along the longitudinnl axis of the borehole, and will be suppressed (i.e. the detected amplitude will be proportional to M sin $\phi$) by dipole detectors oriented with positive and negative poles in a plane whose normal is oriented at angle $\phi$ with respect to the longitudinal axis of the borehole. Thus, dipole detectors oriented with $\phi=0$ will totally suppress modal waves.

In the inventive method, the angle of incidence, $\Theta$, of a seismic wave at a hydrophone pair of the inventive system (such as pair of detectors 14, and 16 of FIG. 4) is determined in signal processing unit 24 as follows. If hydrophone 14 is oriented in the x-direction (where the z-direction is parallel to the axis of streamer 32) then the signal detected by hydrophone 14 will have amplitude $A_x = A \cos \Theta$, where A is the amplitude of the incident wave, and the signal detected by hydrophone 16 will have amplitude $A_y = A \sin \Theta$. Amplitudes $A_x$ and $A_y$ are processed in unit 24 (such as by dividing one amplitude by the other) to generate a signal indicative of angle $\Theta$. In order to determine the orientation of the x-axis relative to formation 22, one would employ an orientation sensing device (not shown in FIG. 4) mounted in streamer 32 near hydrophone 14 (in the manner that orientation sensing devices 8 and 9 are mounted in streamer 2 in FIG. 2). A suitable orientation sensing device may be selected from a variety of commercially available types such as a gyrocompass which are capable of sending orientation information to unit 24 (for example, via an electric line). In unit 24, the orientation of the x-axis relative to formation 22 may be determined from the orientation information in a conventional manner.

Once angle $\Theta$ is determined, the amplitude A of the incident wave may be computed in unit 24 to be:

$A = A_x/\cos \Theta$, for $\Theta \neq \pi/2$, $3\pi/3$, and so on, or $A = A_y/\sin \Theta$, for $\Theta \neq 0$, $\pi$, so on.

Unit 24 may be selected from commercially available computers such as an Alpha Micro mini-computer, which may be programmed in a manner apparent to those of ordinary skill in the computer programming art to perform the signal processing operations described herein. The algorithm is simple enough to be hard-wired in a custom microchip in a manner that will be apparent to those of ordinary skill in that art.

In the inventive embodiments employing a downhole streamer, the ratio of the hydrophones' sensitivity to dipole waves relative to their sensitivity to monopole waves is proportional to the ratio of the hydrophone diameter D, to the wavelength, L, of the detected waves. Preferably, this ratio (D/L) will be maximized with the constraint that the predomiant frequency, F, of the detected waves does not exceed the threshold frequency for dipole modal wave generation in the borehole.

Another preferred embodiment of the invention will be described with reference to FIG. 7. Streamer 100 is towed in body of water 94 by vessel 90. Vessel 90 also tows seismic source 92 at the end of line 93. Streamer 100 is of the flexible type conventiona lly used in marine seismic exploration, but has seven pairs (101, 103, 105, 107, 109, 111, and 113) of orthogonally mounted dipole hydrophones instead of (or in addition to) conventional seismic detectors. Streamer 100 also includes orientation sensing devices 104, 106, and 110. It should be appreciated that any positive integral number of orthogonal dipole hydrophone pairs and any number of orientation sensing devices may be employed in performing the invention. In one alternative embodiment, no orientation sensing device is employed. Streamer 100, devices 104, 106, and 110, and hydrophone pairs 101-113 may be of the same type as the corresponding elements described above with reference to FIGS. 2 and 4. Electrical lines (such as line 120 connected to hydrophone pair 101, and line 121 connected to device 104) connect each hydrophone pair and orientation sensing device to signal processing unit 130 aboard vessel 90. Unit 130 may be of the same type as unit 24 described with reference to FIG. 4.

In operation, source 92 generates seismic wave 140 that propagates past floor 95 of body of water 94 iqto subterranean earth formation 97, and reflects from subterranean reflector 96. Energy in wave 140 that has reflected from reflector 96 is detected at one or more pairs of hydrophones mounted in streamer 100.

Figure 7:
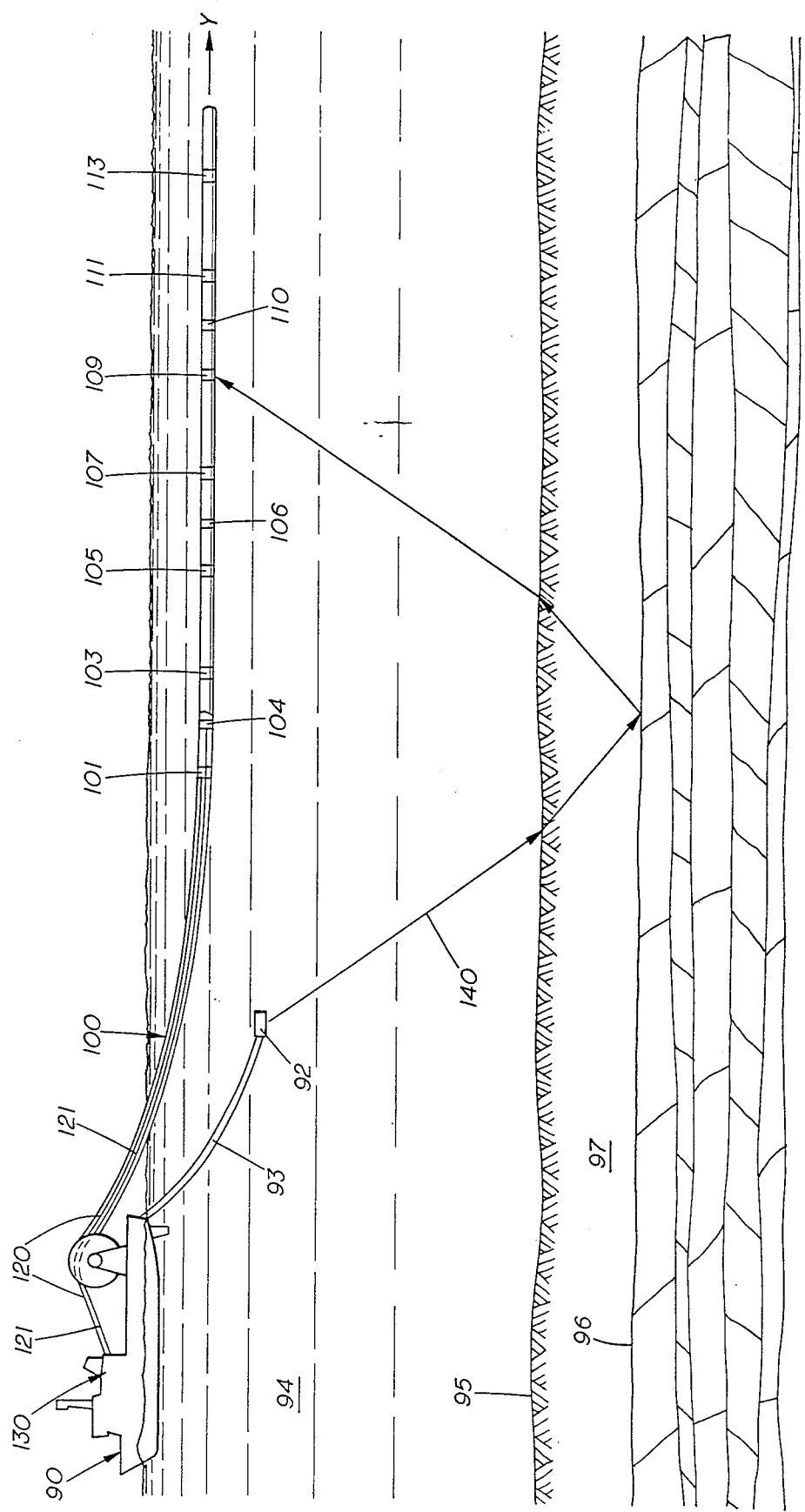
FIG. 7 is a simplified cross-sectional view of a marine seismic source and a streamer housing seven pairs of orthogonal dipole hydrophones. The streamer and source are towed through a body of water by a boat.

In FIG. 7, the longitudinal axis of streamer 100 is parallel to the y-axis. We assume that a first dipole hydrophone in pair 101 is oriented along the z-axis so as to have sensitivity (to vertically propagating pressure waves) proportional to $\cos \Theta$, where $\Theta$ is defined as the angle between the vertical direction and the z-axis. The other hydrophone in pair 101 is oriented so as to have sensitivity (to vertically propagating pressure waves) proportional to $\sin \Theta$. Thus, the amplitude, $A_v$, of the vertically propagating component of the wave energy detected by the hydrophone pair, will be $A_v = A_z \cos \Theta - A_x \sin \Theta$, where $A_z$ is the amplitude detected by the first hydrophone, and $A_x$ is the amplitude detected by the other hydrophone. The cable rotation angle $\Theta$ may be directly read from the nearest of orientation sensing devices 104 and 106, or may be computed in unit 130 by computing the ratio $A_z/A_x = (A \cos \Theta)/(A \sin \Theta) = \cot \Theta$. In the equation in the preceding sentence, A is the absolute amplitude of the wave energy detected by the hydrophone pair. In the embodiment wherein $\Theta$ is computed from signals $A_z$ and $A_x$, a vertically propagating pressure wave will preferably be generated (such as by reflecting an acoustic wave from floor 95), and then detected to produce the signals $A_z = A \cos \Theta$ and $A_x = A \sin \Theta$ used in computing angle $\Theta$.

One advantage of the marine embodiment of the invention described with reference to FIG. 7, is that each dipole hydrophone will be insensitive to cable waves propagating along streamer 100. The effect of horizontally propagating noise (such as acoustic energy propagating directly from source 92 to streamer 100 may be eliminated by computing the vertical amplitude component $A_v$ of the detected signals in the manner described above. Alternatively, if it is desired to determine the amplitude $A_H$ of such horizontally propagating wave energy, this parameter can readily be determined from $\Theta$, $A_z$, and $A_x$ in unit 130 to be $A_H = A_x \cos \Theta + A_z \sin \Theta$.

Various modifications and alterations in the practice of this invention will be apparent to those skilled in the art without departing from the scope of this invention. Although the invention has been described in connection with specific preferred embodiments, it should be understood that the invention as claimed should not be unduly limited to such specific embodiments.

I claim:

1. A seismic exploration method employing a streamer having a longitudinal axis and including at least one pair of dipole hydrophones; each of the dipole hydrophones in the pair having an axis and a sensitivity to wave energy that is a function of the angle of incidence of the wave on the dipole hydrophone with respect to the axis, including the steps of:

(a) orienting the dipole hydrophones in the at least one pair so that the axes of the dipole hydrophones are perpendicular to the longitudinal axis of the streamer and oriented at an angle with respect to each other;

(b) generating a seismic wave that will propagate in a subterranean formation;

(c) detecting at each of the dipole hydrophones in the at least one pair of dipole hydrophones, a signal corresponding to energy in the wave that has reflected from a reflector in the formation; and (d) determining the detected wave energy's incidence angle is a plane perpendicular to the streamer's longitudinal axis from the signals detected at each of the dipole hydrophones and the angle at which the axes of the dipole hydrophones are oriented.

2. The method of claim 1 wherein the dipole hydrophones in the at least one pair are orthogonally mounted.

3. The method of claim 2, also including the step of:

(e) determing the amplitude of the wave energy detected in step (c) from the amplitudes of the wave energy components detected at the two hydrophones in the first pair and from the incidence angle determined in step (d).

4. The method of claim 2, wherein the streamer is flexible and is towed along its longitudinal axis in a body of water during performance of step (b).

5. The method of claim 2, wherein the streamer is longitudinally suspended in a borehole containing fluid during performance of step (c), and the signals are is detected after the reflected energy has propagated from the reflector into the borehole fluid.

6. The method of claim 5, wherein each dipole hydrophone is sensitive to horizontally polarized dipole seismic wave energy but is oriented so as to be insensitive to tube waves and modal waves propgating parallel to the longitudinal axis of the borehole.

7. The method of claim 5, also including the step of filtering the detected signals to suppress the frequency components thereof having frequency greater than the threshold frequency for dipole modal wave propagation in the borehole.

8. The method of claim 5, wherein the seismio wave is generated so as to have frequency content such that the amplitudes of the frequency components of the detected wave energy having frequency greater than F, the threshold frequency for dipole modal wave propagation in the borehole, are neglagable relative to the amplitudes of the frequency components having frequency less than F.

9. The method of claim 7 or 8, wherein the detected wave energy has predominant wavelength L, each dipole hydrophone has diameter D, and L and D are selected so as to maximize the ratio D/L.

10. A seismic exploration system, comprising a streamer having a longitudinal axis and including at least one pair of dipole hydrophones for detecting a seismic wave that has reflected from a reflector in a subterranean formation, wherein each of the dipole hydrophones has an axis and a sensitivity to seismic wave energy that is a function of the angle of incidence of the wave on the dipole with respect to the axis, and wherein the dipole hydrophones in the at least one pair are oriented so that the axes of the dipole hydrophones are perpendicular to the longitudinal axis of the streamer and are oriented at an angle with respect to each other.

11. The system of claim 10, wherein the dipole hydrophones in the at least one pair are orthogonally mounted.

12. The system of claim 11, wherein the streamer is sized so that it may be suspended in a borehole containing fluid and each dipole hydrophone is capable of detecting energy in the seismic wave that has propagated into the borehole fluid after reflecting from the reflector in the subterranean formation.

13. The system of claim 12, wherein the acoustic impedance of the streamer is selected to match that of the fluid.

14. The system of claim 12, including a low-pass filter electrically connected with each hydrophone for suppressing the frequency components of the detected wave energy having frequency above the threshold frequency for dipole modal wave propagation in the borehole.

15. The system of claim 12, also inoluding a seismic source capable of generating the seismic wave in such a manner that the seismic wave has frequency content such that the frequency components of the detected wave energy having frequency greater than· F, the threshold frequency for dipole modal wave propagation in the borehole, have neglagable amplitude relative to the frequency components thereof having frequency less than F.

16. The system of claim 11, wherein the streamer is flexible and is adapted to be towed longitudinally in a body of water by a marine vessel, and each dipole hydrophone is capable of detecting energy in the seismic wave that has propagated into the body of water after reflecting from the reflector in the subterranean formation.

17. The system of claim 16, wherein one hydrophone in each dipole hydrophone pair is oriented to be sensitive to horizontally propagating seismic wave energy when the streamer's longitudinal axis is horizontal and the other dipole hydrophone in each pair is oriented to be sensitive to vertically propagating seismic wave energy when the streamer's axis is horizontal.

18. The system of claim 10 or 12, wherein at least one dipole hydrophone pair is mounted so that both hydrophones in the pair are positioned during operation at substantially the same position along the streamer's longitudinal axis.

* * * * *